April 26, 1927.
J. M. FRANK
1,626,400
UNIT FOR HEATING AND VENTILATING SYSTEMS
Filed Dec. 22, 1923
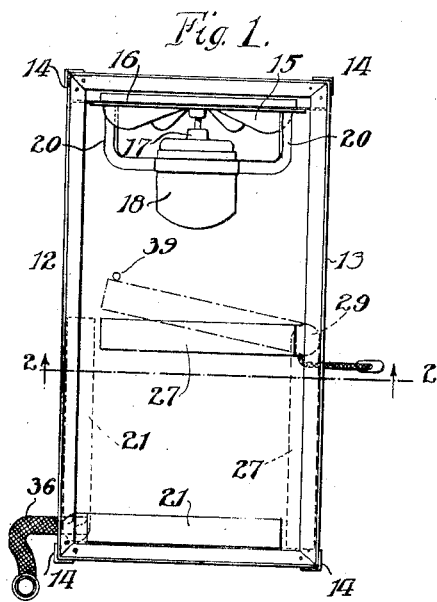
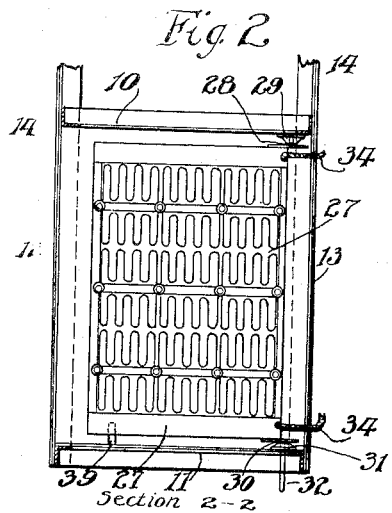
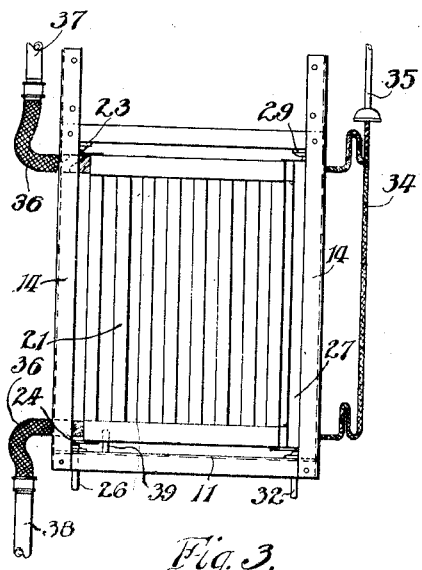
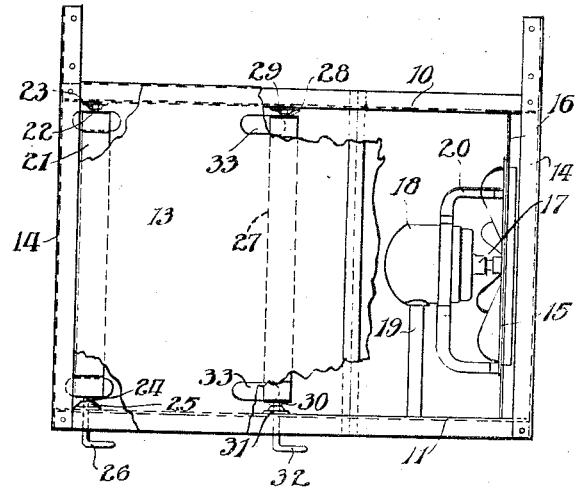
INVENTOR.
John M. Frank
BY Samuel N. Pond,
ATTORNEYS.

Patented Apr. 26, 1927.

1,626,400

UNITED STATES PATENT OFFICE.

JOHN M. FRANK, OF CHICAGO, ILLINOIS, ASSIGNOR TO ILG ELECTRIC VENTILATING COMPANY, OF CHICAGO, ILLINOIS, A CORPORATION OF LOUISIANA.

UNIT FOR HEATING AND VENTILATING SYSTEMS.

Application filed December 22, 1923. Serial No. 682,163.

This invention relates to apparatus for heating and ventilating systems of the general character and type disclosed in my former Letters Patent No. 1,295,151, dated February 25, 1919, said patent showing a box or casing adapted to be suspended from a ceiling or mounted upon a wall, a heating element in the rear of said box or casing, a propeller fan drawing air through said casing over said heating element, and means for directing the warmed current of air to the desired locality.

My present invention is designed as an improvement upon the apparatus of my former patent, and among the objects sought by the present invention are, to provide a heating and ventilating unit wherein the total area of heating means, over which the air is drawn by the fan, can be varied as desired from zero to a maximum, in that manner varying the amount of heat imparted to the air, to provide a heater employing a heating element that is movable into and out of the path of flow of the air, to provide a heater employing a pair of heating elements, neither, either or both of which may be used as desired, to provide an apparatus employing a pair of heaters served by different heating mediums, such as steam and electricity, the former of which may be used during working hours when steam from a boiler is available, while the latter may be used at night when the steam may not be available, and to provide a heater, the heating element or elements of which shall be so mounted in or near the casing that they may be placed fully or partially across the path of flow of the air, or may be moved entirely out of the path of flow of the air when ventilation alone is desired, so as to reduce air friction.

Other objects and attendant advantages of the invention will be apparent to persons skilled in the art as the same becomes better understood by reference to the following detailed description, taken in connection with the accompanying drawings in which I have illustrated one practical embodiment of the invention, and wherein—

Fig. 1 is a top plan view of my improved unit heater and ventilator, with the top of the casing removed;

Fig. 2 is a vertical cross-section on the line 2—2 of Fig. 1;

Fig. 3 is a rear end view; and

Fig. 4 is a side elevation, viewed from the right of Fig. 1 with parts broken away.

Referring to the drawing, the casing is a rectangular sheet-metal structure having a top wall 10, bottom wall 11 and side walls 12 and 13, the casing being opened at both its front and rear ends. Where the casing is designed to be suspended from an overhead wall or ceiling, it is provided at its four corners with angle bar suspension strips 14 projecting above the top wall 10 and adapted to be fastened in any suitable manner to an overhead support, such as a ceiling.

In the front portion of the casing is mounted a propeller fan 15 that occupies a circular opening in a transverse partition 16, said opening having a smaller area than the area of the rear open end of the casing, and said fan being directly driven by an electric motor conventionally shown at 17 that, in preferred practice, is provided with a protective hood or housing 18 from which leads a suction pipe 19 opening through the bottom wall 11 of the casing, the motor and fan being supported from the partition 16 by a series of radial arms 20. This combined electric motor and direct driven propeller fan as herein shown is substantially like that disclosed in Letters Patent No. 831,284 to Robert A. Ilg, dated September 18, 1906.

In the rear end of the casing is a heat radiating element consisting of one or more steam coils or a radiator stack diagrammatically indicated at 21. The steam radiator 21 as herein shown is pivotally mounted at one side, having at its upper end a pintle 22 fitted to a bearing 23 on the top wall of the casing and, at its lower end, having a pintle 24, formed with a flange or collar 25 resting on the bottom wall, and extending below the latter and terminating in a handle 26, by which the radiator may be swung from a position transverse to the casing as shown by full lines in Fig. 1, to a position at right angles thereto wherein it lies alongside one of the side walls, such as 12, of the casing, as shown by dotted lines in Fig. 1. As shown in Figs. 1 and 3, the width of the radiator 21 is sufficiently less than the internal width of the casing to provide clearance space for the idle position of an electric grid or radiator next to be described.

At 27 is conventionally shown an electric grid or radiator that is pivotally mounted in the casing at a point approximately mid-length of the latter and adjacent to the opposite side of the casing; this electric radiator has at its upper end a pintle 28 mounted in a step bearing 29 on the top wall 10 and at its lower end a pintle 30, having formed thereon a flange or collar 31 resting on the bottom wall 11, and extending through the latter and terminating in a handle 32 by which it may be turned. This electric radiator is also sufficiently narrower than the internal width of the casing to accommodate the free end of the steam radiator 21 when the latter is in idle position as clearly shown in Fig. 1.

In the side wall 13 are formed hand openings 33 through which flexible electric leads 34 are carried to the radiator from an electric conduit 35; and in the opposite side wall 12 similar holes (not shown) are formed for the introduction of flexible steam hose 36 leading into the steam radiator 21 from steam supply and return pipes 37 and 38.

39 is a stop mounted in the top or bottom wall of the casing (the bottom wall as herein shown) which limits the forward swing of the electric radiator 27 to a position which permits the steam radiator 21 to swing to its idle position shown by dotted lines in Fig. 1.

In the operation of the device, with the steam and electric radiators both in working position, as shown by full lines in Fig. 1, the air drawn thereover by the fan is heated by both radiators and the heated air delivered by the fan is at the maximum temperature required in the coldest weather. Where the device is installed in a situation where steam is available during the day time, and the steam radiator alone is adequate to supply the requisite heat, the electric radiator will be swung to idle position indicated by dotted lines in Fig. 1, to do which, it is first swung to the dot and dash line position shown in Fig. 1, the steam radiator is then swung to its idle position shown by dotted lines in Fig. 1, and the electric radiator may then be swung to idle position alongside the wall 13, after which the steam radiator is returned to working position. If it is desired to maintain heat in the room through the agency of the heater during the night when steam is not available, the steam radiator is swung to idle position, and the electric radiator is swung to working position and, the current being turned on, the air thrown into the room by the fan is warmed by being drawn over the electric radiator.

If ventilation alone is required, both radiators may manifestly be swung to idle position and, in such position, of course they leave a free open path of flow for the air induced through the casing by the fan. Hence, it will be seen that my improved heating and ventilating device is adapted for service under quite widely varying conditions. Where ventilation alone is desired, this may be had by cutting off both the steam and electric current and the flow of the air may be facilitated by swinging both radiators to idle position. If heating by steam alone is desired, this is obtainable by shifting the steam radiator alone to working position and turning on the steam, the electric radiator being preferably shifted to idle position to reduce the friction on the air current. Where electric heating alone is desired, the electric heater may be similarly manipulated the steam radiator being preferably moved to idle position to reduce the friction on the air; and when heating by both agents is desired, as in very cold weather, both radiators may be employed.

While I have herein shown one practical embodiment of the principle of the invention, it is manifest that the structural details thereof may be considerably varied without involving any departure from the principle of the invention or sacrificing any of the advantages thereof. For instance, while I have shown and described the air moving device and the heating elements as mounted in the casing, it is manifest that any or all of these elements might be elsewhere located so long as they serve to create a current of air through the casing and heat said current of air. Hence, I reserve such variations and modifications as fall within the scope and purview of the appended claims.

I claim—

1. In a heating and ventilating unit, the combination of a casing open at front and rear, an air moving device mounted in said casing, and a pair of heating elements mounted in and spaced lengthwise of said casing and independently movable into and out of the path of air flowing through said casing.

2. In a heating and ventilating unit, the combination of a casing open at front and rear, a propeller fan mounted in the front end of said casing, and a pair of heating elements mounted in said casing behind said fan and spaced lengthwise of said casing, and independently movable into and out of the path of air flowing through said casing.

3. In a heating and ventilating apparatus, the combination of a casing formed with openings to permit the flow of air therethrough, means for effecting a flow of air through said casing, and steam and electric radiators so mounted as to be movable into and out of the path of flow of the air.

4. In a heating and ventilating apparatus, the combination of a casing formed with openings to permit the flow of air therethrough, means for effecting a flow of air through said casing, pivotally mounted steam and electric radiators, and means for independently swinging both of said radiators into and out of the path of flow of the air.

5. In a heating and ventilating unit, the combination of a casing open at front and rear, a propeller fan mounted in the front end of said casing, and steam and electric radiators mounted in said casing in rear of said fan, said radiators being independently movable into and out of the path of flow of the air induced through said casing by said fan.

6. In a heating and ventilating unit, the combination of a substantially rectangular casing open at front and rear, a propeller fan mounted in the front end of said casing, steam and electric radiators pivotally mounted at one vertical edge thereof within and adjacent to the side walls of said casing, and means for swinging said radiators between positions crosswise of said casing and parallel with and adjacent to the side walls thereof.

7. In a heating and ventilating unit, the combination of a substantially rectangular casing open at front and rear, a propeller fan mounted in the front end of said casing, steam and electric radiators in said casing in rear of said fan, one of said radiators being pivoted at one vertical edge thereof adjacent to one side wall of said casing and the other of said radiators being pivoted at one vertical edge thereof adjacent to the opposite side wall of said casing, and independently operable means for swinging said radiators between positions crosswise of said casing and parallel with and adjacent to the respective side walls thereof.

JOHN M. FRANK.